(12) United States Patent
Cornell et al.

(10) Patent No.: US 9,026,985 B2
(45) Date of Patent: May 5, 2015

(54) DYNAMICALLY CONFIGURABLE MODEL-TO-MODEL TRANSFORMATION ENGINE

(75) Inventors: Kevin J. Cornell, Stittsville (CA); Eric O. Funk, Kanata (CA); Duong B. Nguyen, Nepean (CA); David Ruest, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1832 days.

(21) Appl. No.: 11/009,680

(22) Filed: Dec. 10, 2004

(65) Prior Publication Data

US 2006/0130009 A1 Jun. 15, 2006

(51) Int. Cl.
G06F 9/44 (2006.01)
G06F 9/45 (2006.01)
G05B 13/02 (2006.01)

(52) U.S. Cl.
CPC ........................................ *G06F 8/10* (2013.01)

(58) Field of Classification Search
USPC .......................................... 717/104, 106, 136
See application file for complete search history.

(56) References Cited

U.S. PATENT DOCUMENTS

| | | | |
|---|---|---|---|
| 5,911,074 A * | 6/1999 | Leprince et al. | 717/100 |
| 6,615,220 B1 | 9/2003 | Austin et al. | |
| 6,711,734 B1 * | 3/2004 | Baisley | 717/104 |
| 6,996,800 B2 * | 2/2006 | Lucassen et al. | 717/106 |
| 7,725,300 B2 * | 5/2010 | Pinto et al. | 703/2 |
| 2003/0177481 A1 * | 9/2003 | Amaru et al. | 717/148 |
| 2004/0083199 A1 * | 4/2004 | Govindugari et al. | 707/1 |
| 2005/0216917 A1 * | 9/2005 | Krishnaswamy et al. | 719/315 |
| 2006/0064667 A1 * | 3/2006 | Freitas | 717/104 |
| 2007/0130180 A1 * | 6/2007 | Rasmussen | 707/100 |

OTHER PUBLICATIONS

Ho, Wai Ming et al., "UMLAUT: an Extendible UML Transformation Framework", 14th IEEE International Conference on Automated Software Engineering (ASE'99) p. 275-79.*

Kurtev, I. and van den Berg, K. 2003. Model driven architecture based XML processing. In Proceedings of the 2003 ACM Symposium on Document Engineering (Grenoble, France, Nov. 20-22, 2003). DocEng '03. ACM, New York, NY, 246-248. DOI=http://doi.acm.org/10.1145/958220.958264.*

(Continued)

*Primary Examiner* — Ryan Coyer
(74) *Attorney, Agent, or Firm* — Steven M. Greenberg, Esq.; CRGO Law

(57) ABSTRACT

A method, system and apparatus for processing a model-to-model transformation. The method can include dynamically accepting a transformation to apply to a source model in order to produce a target model. More specifically, the method can include traversing a hierarchy for the source model and applying rules in the transformation to objects in the hierarchy to produce the target model. For instance, the traversing step can include sequentially processing a list of transform elements in the transformation. In one aspect of the invention, the processing step can include loading content extractors among the transform elements. Subsequently, other transform elements can be identified through the loaded content extractors in order to traverse the hierarchy.

12 Claims, 4 Drawing Sheets

(56) References Cited

OTHER PUBLICATIONS

Rensink, Arend (Editor), "Model Driven Architecture: Foundations and Applications", CTIT Technical Report TR-CTIT-03-27, University of Twente, Jun. 27, 2003.*

The Value of Modeling; Nov. 15, 2004; pp. 1-6; An abstract of this article may be found at http://www-06.ibm.com/developerworks/rational/library/nov04/naiburg-cernosek/index.html.

Alan Brown; An Introduction to the IBM Rational Design & Construction Tool Strategy; Nov. 15, 2004; pp. 1-7.

Will MDD Fulfill Its Promises?; IEEE Computer Society, pp. 5-7.

Dan Matheson, et al; Managed Evolution of a Model Driven Development Approach to Software-Based Solutions; OOPSLA & GPCE Workshop 2004: Best Practices for Model Driven Software Development; pp. 1-19.

* cited by examiner

DYNAMICALLY CONFIGURABLE MODEL-TO-MODEL TRANSFORMATION ENGINE

BACKGROUND OF THE INVENTION

1. Statement of the Technical Field

The present invention relates to field of software development and more particularly to the model driven development of a software application.

2. Description of the Related Art

Modern software systems have become increasingly pervasive and open-ended, and are expected to deliver critical computing services in a dependable manner across multiple, heterogeneous computing environments. To better manage the complexity of developing modern software systems, software development strategies can be employed which raise the level of abstraction at which software systems are conceived, implemented and evolved. Model-driven development (MDD) represents one such software development strategy in which models are the primary artifacts of software development. As used herein, a "model" refers to a collection of information having a well-defined containment hierarchy.

Modeling complex applications has several general benefits which can include a better understanding of the business or engineering situation at hand, the construction and design of an application architecture, and the creation of visualizations of code and other forms of implementation. Although some may argue that application visualization alone does not constitute a model, the essence of modeling is abstraction and any visualization of code is indeed an abstraction in that application information can be selectively exposed while details deemed unnecessary or unwanted can be suppressed. Nevertheless, the terms "code model", "implementation model" or "platform-specific model" (PSM) are often used to qualify such abstractions from a higher-level, platform independent model (PIM) that does not have such direct relationships to program code.

In conventional MDD, visual models can be created from a methodological process that often begins with application requirements and culminates with a high-level architectural design model. Developers can create a detailed design model from which skeletal code can be generated to an integrated development environment. The integrated development environment, in turn, can be used to complete the detailed coding. Any changes to the code that affect the design model can be synchronized back into the model. Likewise, any model changes can be synchronized into the existing code.

Modern trends in MDD include software development tools and techniques that support the vision of the Object Management Group as framed by the "Model Driven Architecture" (MDA). The MDA advocates an approach in which models of software that abstract over technology-specific details are systematically transformed to deployable technology-specific implementations. In this regard, a transformation defines changes that are applied to a source model to produce a target model. While the models enjoy specific relationships between one another, the transformation steps are often a discontinuous jump forward rather than a specifiable mechanical transformation. The discontinuous jump is most noticeable in the early stages of design refinement and solution exploration where fundamental decisions are made by the software engineer in order to satisfy solution requirements.

Systematic support for model transformations is considered to be critical to the success of the MDA. Often referred to as a model-to-model transformation, the source and target models can be based upon a meta-model like the unified modeling language (UML), including customer specific meta-models. For example, the PIM can be a UML2 model marked up with stereotypes and the resulting PSM created by the transformation might be Java code modules. At present model-to-model transformations are manually driven and can require substantial expertise and development resources to perfect. Yet, as MDD matures, it will be desirable to automate the generation of a PSM from a PIM such that the transformation can fit the mold of a code generator.

SUMMARY OF THE INVENTION

The present invention addresses the deficiencies of the art in respect to model-to-model transformations and provides a novel and non-obvious dynamically configurable model-to-model transformation engine. In this regard, the transformation engine of the present invention can traverse complicated source models and execute rules to either generate or update target models. The transformation engine can support multiple types of source and target models, and since a single source model can be used by multiple transformations to generate different target models, the engine further can provide logic for traversing the source model in multiple different ways.

The present invention can include a model-to-model transformation. In the present invention, a model-to-model transformation can include an ordered list of transform elements. Each element can be a transformation rule or a content extractor. The content extractor can reference at least one object for extraction in the element. The content extractor further can reference one other element in the transformation. In one aspect of the invention, at least one property can be referenced by the transformation. Also, in another aspect of the invention, at least one condition can be referenced by at least one of the transform elements.

In more particular illustration, a method for processing a model-to-model transformation can include dynamically accepting a transformation to apply to a source model in order to produce a target model. More specifically, the method can include traversing a hierarchy for the source model and applying rules in the transformation to objects in the hierarchy to produce the target model. For instance, the traversing step can include sequentially processing a list of transform elements in the transformation.

In one aspect of the invention, the processing step can include loading content extractors among the transform elements. Subsequently, other transform elements can be identified through the loaded content extractors in order to traverse the hierarchy. The applying step, by comparison, can include loading transformation rules among the transform elements and applying the loaded transformation rules to objects in the hierarchy to produce the target model. Yet, in a preferred aspect of the invention, the applying step can include conditionally applying the loaded transformation rules to objects in the hierarchy to produce the target model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a dynamically configurable model-to-model transformation engine. In accordance with the present invention, a dynamically configurable model-to-model transformation engine can dynamically accept a transformation to apply to a source model in order to produce a target model. The transformation can include one or more transform elements, for instance each transform element can include a transformation rule, a content extractor and a reference to other transform elements. The repeated exercise of the transformation rule and extractors for each transform element in the transformation can act to traverse a hierarchy of objects in a source model in order to produce the target model automatically.

More specifically, the transformation rule can specify the creation or update of an element in the target model for a given element in the source model. In this regard, an element in the source model can include by way of example, a package, a class, a method member of the class, or a data member of the class. The content extractor can specify the extraction of one or more objects in the given element for processing by an additional set of rules and content extractors. By repetitively applying the rules and content extractor, each object in the hierarchy of the source model can be traversed and transformed into the target model.

Figure 1:
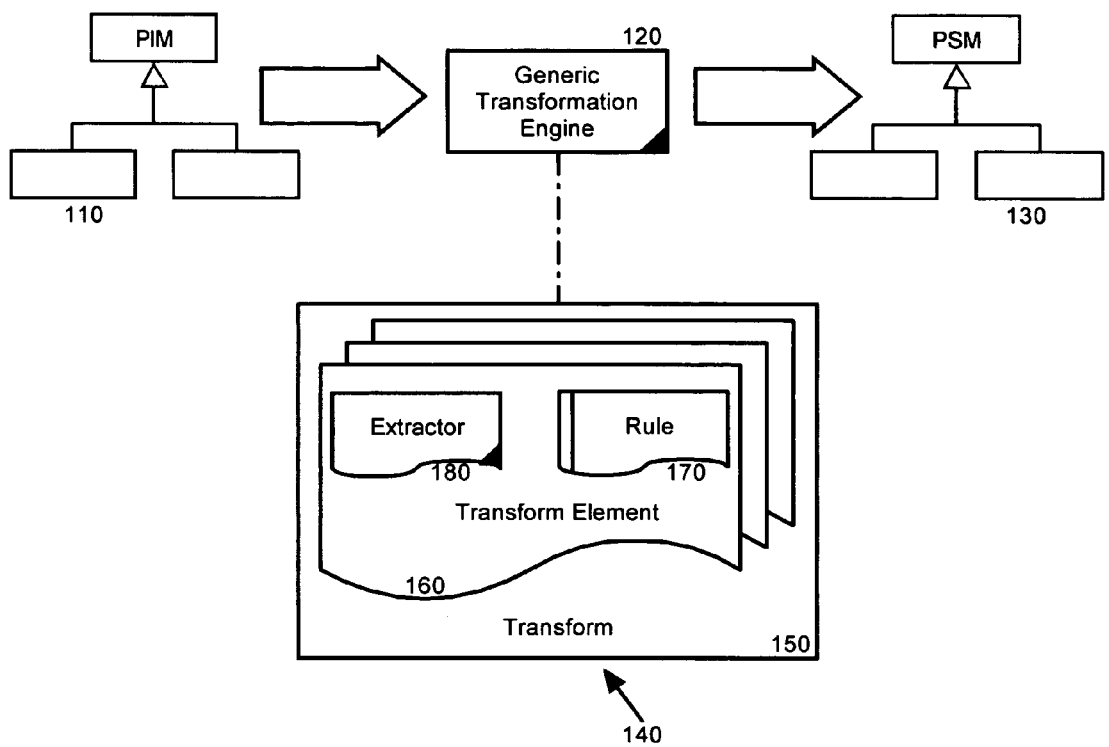
FIG. 1 is a schematic illustration of a dynamically configurable model-to-model transformation engine.

In more particular illustration, FIG. 1 is a schematic illustration of a dynamically configurable model-to-model transformation engine. The transformation engine 120 of the present invention can be dynamically configured with a transformation 140 to specify a manner in which a source model 110 can be traversed and transformed to produce a target model 130. The transformation 140 can include a transform 150 which can act as a container to a sequence of transform elements 160. Each transform element 160 can be a transformation rule 170, or a content extractor 180. Moreover, a transform element 160 can also be another transform 150, which is also referred to as a sub-transform.

In operation, the transform 150 can execute a source object in the source model 110 by sequentially executing all of its contained transform elements 160 with that same source object in the source model 110. A transformation rule 170 can execute the source object in the source model 110 by converting the source object to one or more objects in the target model 130. Finally, a content extractor 180 can execute a source object in the source model 110 by extracting the desired content of that source object and then executing each resulting object with an associated transform 150.

Figure 2:
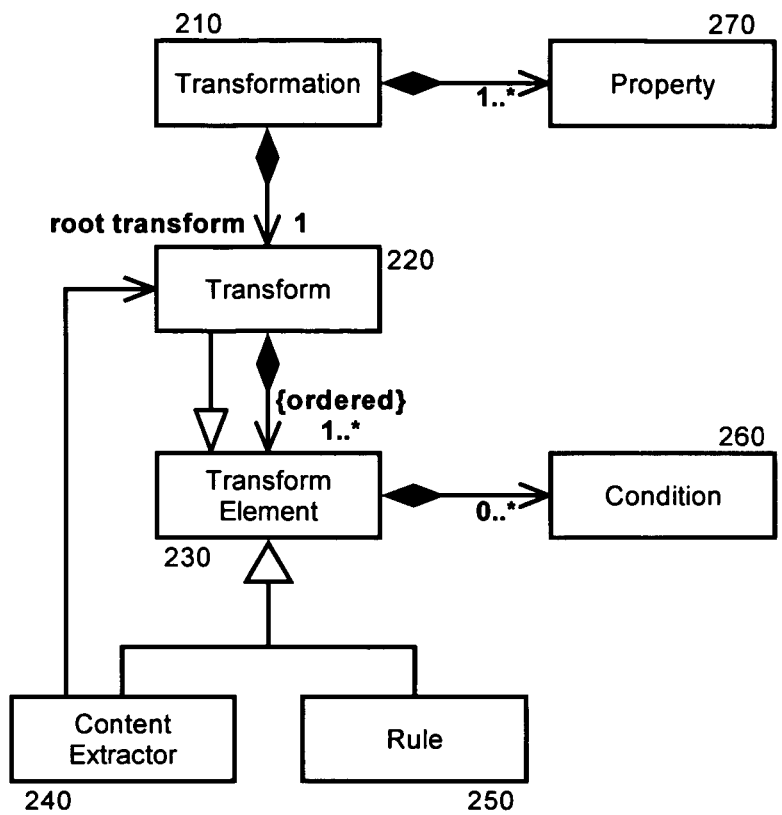
FIG. 2 is an object model of the dynamically configurable model-to-model transformation engine of FIG. 1.

To further illustrate the structure and function of the transformation engine of the present invention, FIG. 2 is an object model of a dynamically configurable model-to-model transformation engine. As shown in FIG. 2, a transformation 210 can include a reference to a transform 220. The transform 220 can include a reference to one or more transform elements 230. Each transform element 230 can be a content extractor 240 or a rule 250. Moreover, each transform element 230 can be a sub-transform 220. In this regard, a sub-transform can execute the same source object as if its contained transform elements were part of the parent transform.

A transformation 210 can include a single root transform 220 and many associated properties 270. Properties 270 can include name/value pairs that define data for the transformation 210 when the transformation 210 executes. The root transform 220 can include rules 250 for performing initial and final processing and content extractors 240 for processing the given source model object or objects. The connections between the transforms 220, rules 250 and content extractors 240 can determine how the source model is to be traversed. In some cases, the transform 220 can include direct references to rules 250 and extractors 240 and indirect references to other transforms 220 through the content extractors 240.

Importantly, the indirect references to other transforms enable the traversal of the source model. Direct references to other transforms, by comparison, referred to as sub-transforms, can enable the re-use of existing transforms including other transformations. Notably, the direct reference to other existing transforms can be utilized to create a new composite form of a transformation, or to clone an existing transformation that can subsequently be modified without affecting the original transform.

Referring once again to FIG. 2, a transformation 210 can be executed within a given execution context, which can provide access to one or more associated properties 270. The execution context contains a reference to all of the transformation properties 270 including one for the current source object in process and another one of the properties 270 for the current target container object. Due to the recursive nature of the transformation engine, the execution context can provide the ability to temporarily override properties 270 when executing a nested transform, such that after the nested transform has completed, the original property values are available again. This override capability of the execution context can be important since the current source and target container ones of the properties 270 in the context can change as the source model is traversed and as the target model is generated. Optionally, though, before any transform element 230 can execute, first the transform element 230 must accept the current context. In that circumstance, if a transform element does not accept the current context, it is not executed.

The acceptance can be conditionally performed based upon a condition 260. For example, a rule designed to process an operation can have a condition that returns true if the source object is an operation thereby permitting the execution of the rule on that operation, and false otherwise, thereby blocking the execution of the rule. The conditional execution of a source object in a source model to produce a target object in the target model can be valuable to those seeking to automate the process of generating one or more detailed models from an abstract model. For example, by applying several transformations on models at various levels of abstraction, system architects can more easily generate all aspects of a business system including the front end interface, and the back end database control.

In operation, when a transformation 210 is executed, the root transform 220 is executed which results in the execution of any contained rules 250 and extractors 240. When executing an extractor 240, the extractor 240 returns a list of related source objects to be processed. Each of the related source objects in the list can be subsequently executed by the transform 220 associated with the extractor 240. Thus, in any transform 220, one or more rules 250 can be defined to perform the required processing of the source object into the target model. Additionally, one or more extractors 240 can be defined to perform the processing for the next level of objects in the source model. Thus, the contained rules, extractors and sub-transforms can be kept in a single ordered list, which can determine how the source model is to be traversed and processed.

Figure 3:
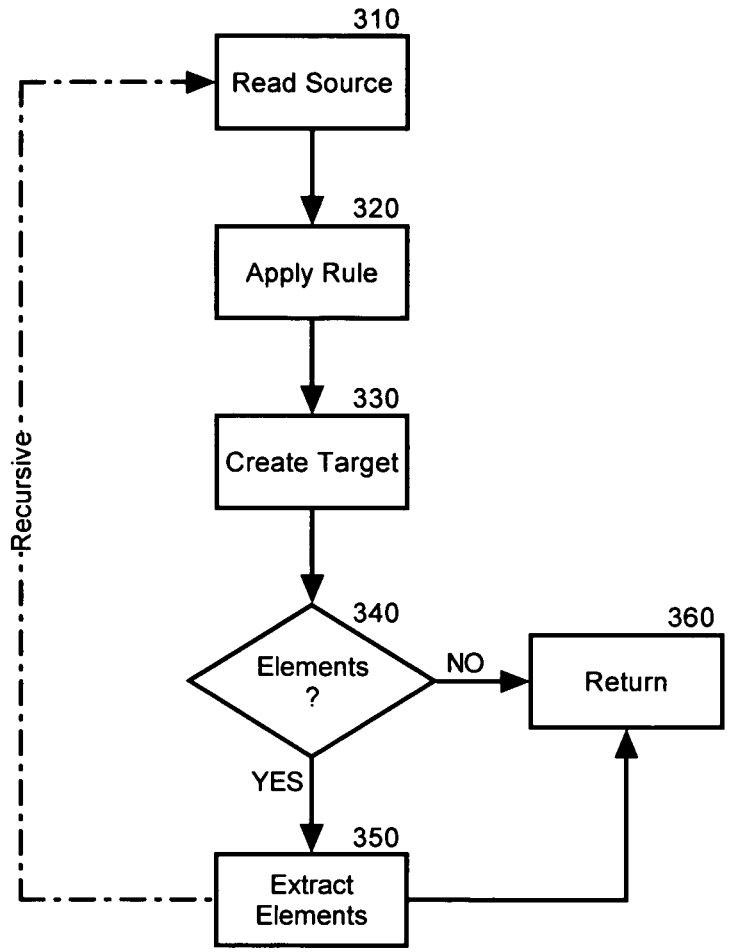
FIG. 3 is a flow chart illustrating a process for performing a model-to-model transformation in the dynamically configurable transformation engine of FIG. 2; and, FIG. 4 is a pictorial illustration of the dynamically configurable model-to-model transformation engine of FIG. 2 configured to process a package-class-attribute and operation hierarchy in a model-to-model transformation.

In yet further illustration, FIG. 3 is a flow chart illustrating a process for performing a model-to-model transformation in the dynamically configurable transformation engine of FIG. 2. Within a transform (initially the root transform) and beginning in block 310, a source object in the source model can be read and in block 320, a transformation rule can be applied to the source object. As noted, the application of the rule can be conditional or absolute. In either case, a target object can be created through the operation of the rule.

In decision block 340, it can be determined if additional objects in the source object remain to be processed. If so, in block 350 the additional objects can be extracted and the process of blocks 310 through 340 can be repeated for the additional objects including any nested objects. When no more objects remain to be extracted as determined in decision block 340, in block 360 the process can return. To the extent that the process had been performed for a nested object, the process can return to the previous execution of the process for a parent object. In this way, the hierarchy of the source model can be traversed to completion.

It will be apparent to the skilled artisan that the process of FIG. 3 is a flexible process which enables a given model traversal problem to be solved in multiple ways. Specifically, the containment of rules and extractors within a transform and the associations between extractors and other transforms enables source models to be traversed many different ways. Moreover, based upon the architecture of the transformation engine, a transformation can be constructed to process an entire source model in a single pass, or to process the source model in multiple passes.

The transformation engine of the present invention need not assume any structure within the source model. However, many models are hierarchical in nature, even if the hierarchy is only two levels, e.g., the root element contains all other elements. In consequence, the transformation engine can be tailored for traversing source models that are based upon a hierarchical containment meta-model, such as the UML2 meta-model. For example, in UML2 a package can contain classes and other packages. A class further can contain attributes (properties), operations and other classes. To that end, FIG. 4 is a pictorial illustration of the dynamically configurable model-to-model transformation engine of FIG. 2 configured to process a package-class-attribute and operation hierarchy in a model-to-model transformation.

Figure 4:
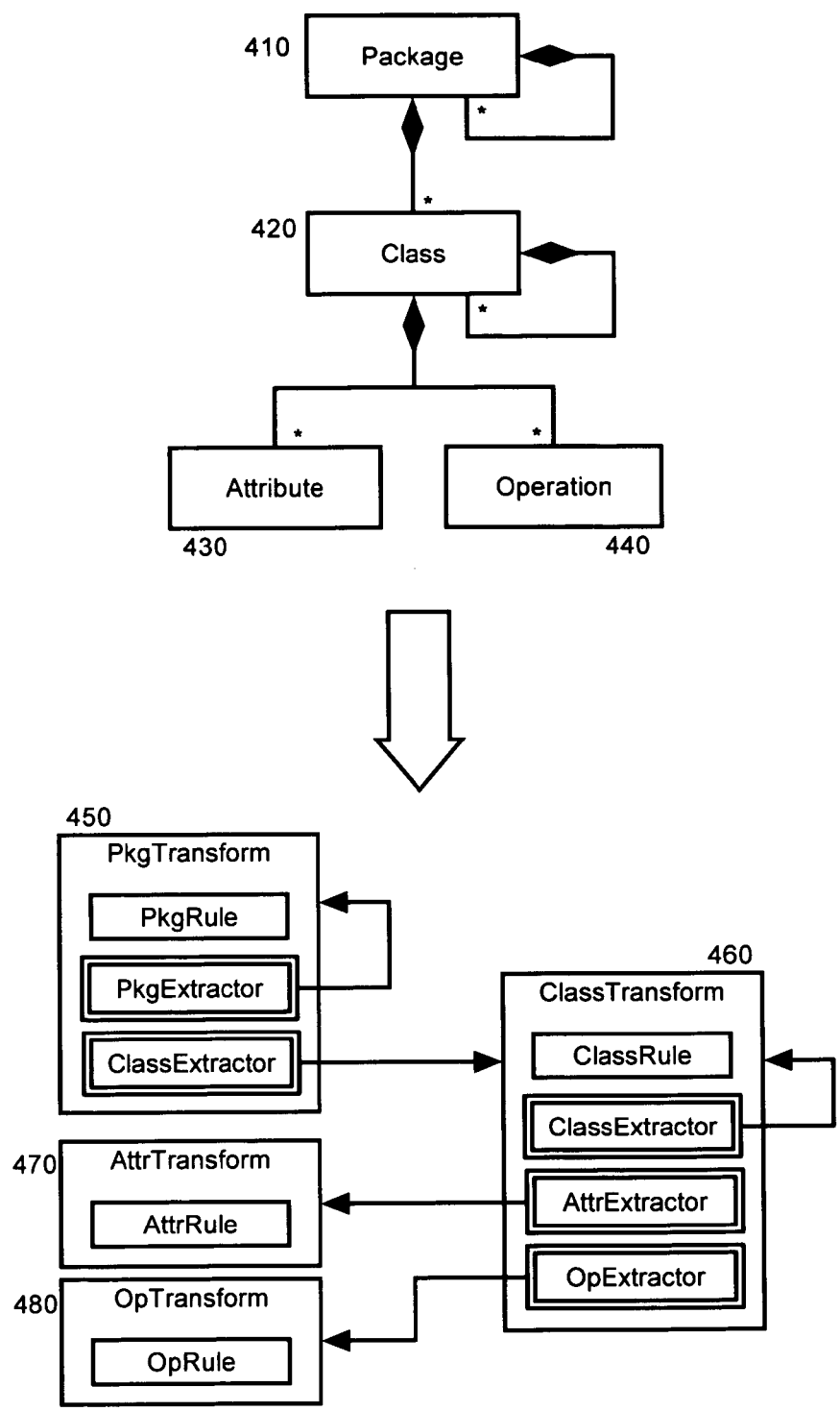

FIG. 4 shows the connection between the elements in the source containment hierarchy and the execution sequence of the transforms, rules and content extractors. In particular, the hierarchy can include a UML2 source model. The UML2 source model can include a package 410 containing one or more classes 420. Each class 420 can encapsulate one or more attributes 430 and one or more operations 440. Notably, each class 420 also can encapsulate one or more other classes 420. Also, each package can include one or more other packages 410.

The target model can be created for the UML2 source model. As shown in FIG. 4, a package transform element 450 can include a package transformation rule and both a package extractor and class extractor. The package extractor can extract other packages contained in the package, while the class extractor can invoke the class transform element 460. The class transform element, in turn, can include a class rule, a class extractor, an attribute extractor and an operation extractor. While the class extractor can extract other nested classes, the attribute extractor can invoke the attribute transform element 470 and the operation extractor can invoke the operation transform 480.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for processing model-to-model transformations comprising the steps of:
    selecting a source model in a transformation engine;
    dynamically accepting a transformation in the transformation engine to be applied to the source model, the transformation identifying a manner in which the source model is traversed and transformed to produce a target model and comprising a container of a sequence of model transform elements, each of the model transform elements comprising one of a transformation rule, a content extractor and another container; and,
    applying the transformation to the source model in order to produce the target model by reading in a source object in the source model upon traversing a hierarchy of source objects in the source model, applying at least one of the transformation rules to the source object from among the transformation rules of said model transform elements, creating a target object for the target model upon application of the at least one transformation rule to the source object, determining if additional objects in the source object remain to be processed, extracting a next additional object from the source object upon determining that additional objects in the source object remain to be processed, reading in the next additional object from the source object, repeating the application, creation, determination, and extraction steps for all additional objects of the source object.

2. The method of claim 1, wherein said traversing step comprises the step of sequentially processing a list of model transform elements in said transformation.

3. The method of claim 2, wherein said processing step comprises the steps of:
loading content extractors among said list of model transform elements; and,
identifying other transform elements through said loaded content extractors in order to traverse said hierarchy.

4. The method of claim 1, wherein said creation step comprises the step of conditionally executing said at least one of the transformation rules on the source object in said hierarchy to produce said target model.

5. A model-to-model transformation engine comprising:
a transformation executing in memory of a computer;
an ordered list of transform elements, each transform element comprising one of a transformation rule, a container, and a content extractor, said content extractor referencing at least one object for extraction in said element, said content extractor further referencing one other transform element in the transformation; and,
a transform coupled to the transformation, the transform configured to act as a container to the ordered list of transform elements,
the model-to-model transformation engine executing in the memory of the computer, the model-to-model transformation engine comprising program code enabled to select a source model, to dynamically accept the transformation to be applied to the source model, the transformation identifying a manner in which the source model is traversed and transformed to produce a target model, to apply the transformation to the source model in order to produce the target model by reading in a source object in the source model upon traversing a hierarchy of source objects in the source model, applying at least one of the transformation rules to the source object from among the transformation rules of said transform elements, creating a target object for the target model upon application of the at least one transformation rule to the source object, determining if additional objects in the source object remain to be processed, extracting a next additional object from the source object upon determining that additional objects in the source object remain to be processed, reading in the next additional object from the source object, repeating the application, creation, determination, and extraction steps for all additional objects of the source object.

6. The model-to-model transformation engine of claim 5, further comprising at least one property referenced by the transformation.

7. The model-to-model transformation engine of claim 6, further comprising an execution context providing access to said at least one property reference by the transformation.

8. The model-to-model transformation engine of claim 5, further comprising at least one condition referenced by at least one of said transform elements.

9. A non-transitory machine readable storage device having stored thereon a computer program for processing model-to-model transformations, the computer program comprising a routine set of instructions which when executed by a machine causes the machine to perform the step of:
selecting a source model in a transformation engine;
dynamically accepting a transformation in the transformation engine to be applied to the source model, the transformation identifying a manner in which the source model is traversed and transformed to produce a target model and comprising a container of a sequence of model transform elements, each of the model transform elements comprising one of a transformation rule, a content extractor and another container;
applying the transformation to the source model in order to produce the target model by reading in a source object in the source model upon traversing a hierarchy of source objects in the source model, applying at least one of the transformation rules to the source object from among the transformation rules of said model transform elements, creating a target object for the target model upon application of the at least one transformation rule to the source object, determining if additional objects in the source object remain to be processed, extracting a next additional object from the source object upon determining that additional objects in the source object remain to be processed, reading in the next additional object from the source object, repeating the application, creation, determination, and extraction steps for all additional objects of the source object.

10. The non-transitory machine readable storage device of claim 9, wherein said traversing step comprises the step of sequentially processing a list of model transform elements in said transformation.

11. The non-transitory machine readable storage device of claim 10, wherein said processing step comprises the steps of:
loading content extractors among said list of model transform elements; and, identifying other transform elements through said loaded content extractors in order to traverse said hierarchy.

12. The non-transitory machine readable storage device of claim 9, wherein said creation step comprises the step of conditionally executing said at least one of the transformation rules on the source object in said hierarchy to produce said target model.

* * * * *